United States Patent
Jagne

(10) Patent No.: US 10,869,573 B2
(45) Date of Patent: Dec. 22, 2020

(54) MULTIMODE TEA MAKING APPARATUS FOR MAKING TRADITIONAL BEVERAGES

(71) Applicant: Cherno Waka Jagne, Bothell, WA (US)

(72) Inventor: Cherno Waka Jagne, Bothell, WA (US)

(*) Notice: Subject to any disclaimer, the term of this patent is extended or adjusted under 35 U.S.C. 154(b) by 0 days.

(21) Appl. No.: 14/821,628

(22) Filed: Aug. 7, 2015

(65) Prior Publication Data
US 2017/0035239 A1 Feb. 9, 2017

(51) Int. Cl.
*A47J 31/52* (2006.01)
*A47J 31/46* (2006.01)

(52) U.S. Cl.
CPC .......... *A47J 31/52* (2013.01); *A47J 31/469* (2018.08); *A47J 31/521* (2018.08); *A47J 31/5253* (2018.08)

(58) Field of Classification Search
CPC .. C08G 18/12; C08G 18/673; C08G 18/0823; C08G 18/302; C08G 18/3231; C08G 18/6692; C08G 18/348; C08G 18/4854; C08G 18/73; C08G 18/755; A47J 31/52; C09D 175/08; C09D 175/16; C23C 16/56
USPC ........ 99/295, 276, 286, 325, 330, 331, 280, 99/284, 285, 287, 289 R, 323, 324, 342, 99/645, 283, 323.1, 323.7, 337, 372, 376, 99/385, 425, 444, 445, 446, 447, 467, 99/470, 510, 275, 277.1, 290, 298, 299, 99/302 P, 302 R, 323.3, 332, 334, 339, 99/340, 341, 346, 348, 349, 357, 373, 99/377; 426/466, 549, 87; 219/401, 502; 392/397
See application file for complete search history.

(56) References Cited

U.S. PATENT DOCUMENTS

| | | | | | |
|---|---|---|---|---|---|
| 3,527,153 | A | * | 9/1970 | Orlando | A47J 31/0573 99/315 |
| 6,155,158 | A | * | 12/2000 | Anson | A47J 31/007 99/280 |
| 7,067,168 | B1 | * | 6/2006 | Podlucky | A47J 31/18 426/431 |
| 2005/0011364 | A1 | * | 1/2005 | Chen | A47J 31/46 99/275 |

(Continued)

*Primary Examiner* — Tu B Hoang
*Assistant Examiner* — Vy T Nguyen
(74) *Attorney, Agent, or Firm* — Arjomad Law Group, PLLC

(57) ABSTRACT

A method and an apparatus are disclosed for brewing hot beverages, such as African green tea or Ataaya, including using a software-controlled electromechanical teapot to control and direct the beverage through various stages of mixing, boiling, cooling, and dispensing with multiple pumps, while monitoring the appropriate temperatures and time to take various actions or transition to various stages of brewing. In various embodiments, the electrical-electronic teapot includes various indicators such as buzzers, information display, lights, and the like to inform the user of various events and states, such as when the beverage is ready for serving. Additionally, a processor or microcontroller may be utilized in the teapot to run the software that controls the operation of the teapot. In some embodiment, the software is configurable, updatable, and/or changeable to alter the operation of the teapot for improved performance or to change the brewing method for different beverages.

15 Claims, 4 Drawing Sheets

(56) References Cited

U.S. PATENT DOCUMENTS

| | | | |
|---|---|---|---|
| 2005/0160917 A1* | 7/2005 | Gantt | A47J 31/402 99/279 |
| 2009/0246341 A1* | 10/2009 | Pitner | A23F 3/16 426/435 |
| 2012/0308688 A1* | 12/2012 | Peterson | A47J 31/002 426/86 |
| 2014/0161940 A1* | 6/2014 | Aviles | B65D 81/3238 426/115 |
| 2014/0328980 A1* | 11/2014 | Novak | B01F 3/04808 426/115 |

* cited by examiner

MULTIMODE TEA MAKING APPARATUS FOR MAKING TRADITIONAL BEVERAGES

TECHNICAL FIELD

This application relates generally to drink preparation. More specifically, this application relates to a method and apparatus for preparing traditional beverages, such as African green tea.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
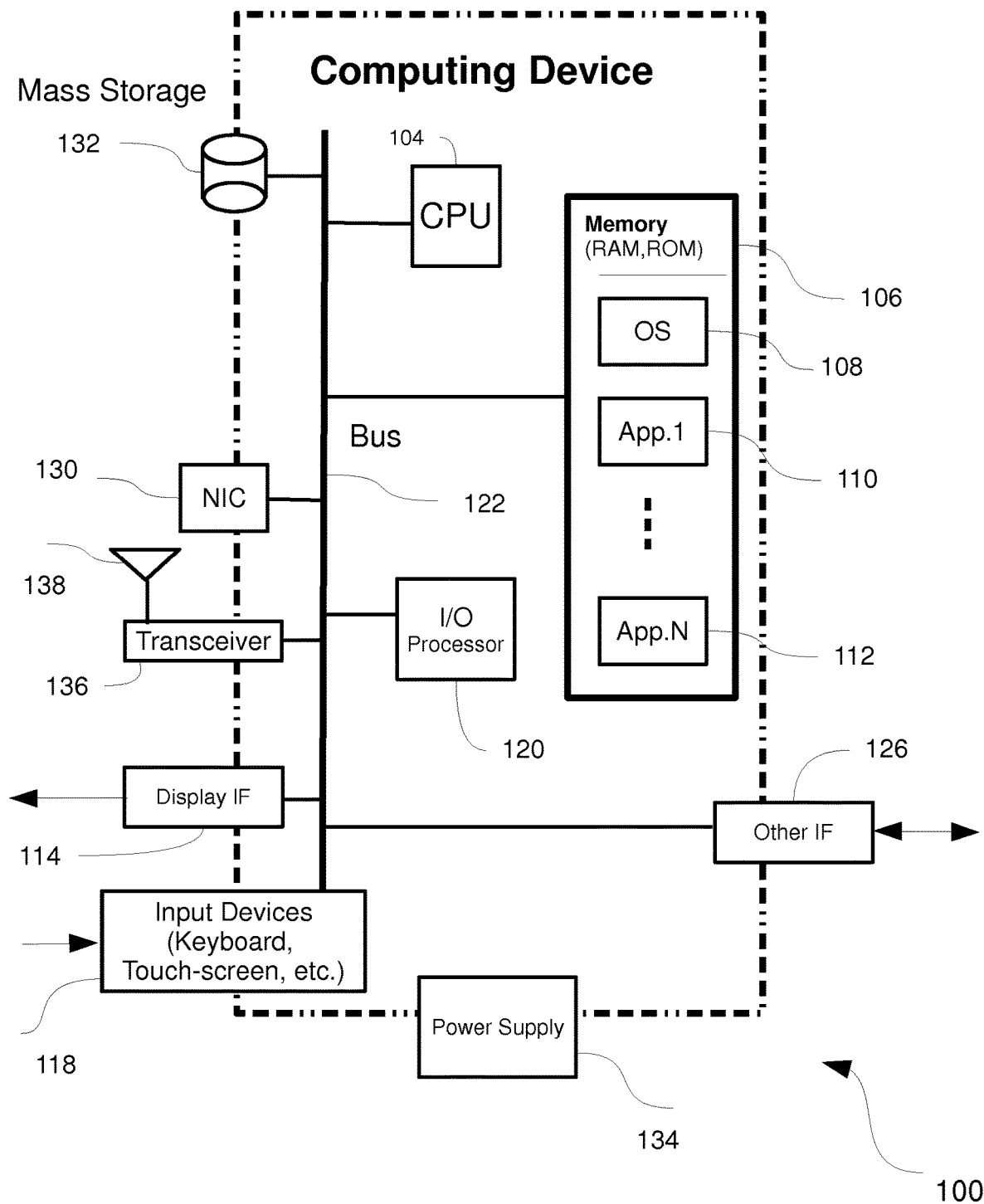
FIG. 1 shows an example computing device that may be used with the present disclosures.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references making African green tea, it will be appreciated that the disclosure may be applicable to other brewed beverages, such as coffee, herb teas, and the like.

Briefly described, a method and an apparatus are disclosed for brewing hot beverages, such as African green tea or Ataaya, including using a software-controlled electromechanical teapot to control and direct the beverage through various stages of mixing, boiling, cooling, and dispensing with multiple pumps, while monitoring the appropriate temperatures and time to take various actions or transition to various stages of brewing. In various embodiments, the electrical-electronic teapot includes various indicators such as buzzers, information display, lights, and the like to inform the user of various events and states, such as when the beverage is ready for serving. Additionally, a processor or microcontroller may be utilized in the teapot to run the software that controls the operation of the teapot. In some embodiment, the software is configurable, updatable, and/or changeable to alter the operation of the teapot for improved performance or to change the brewing method for different beverages.

A common and popular style of tea in Africa is green tea, which is similar to the Moroccan mint tea but stronger in flavor. The brewing of this tea is rather complicated and includes boiling, cooling, re-boiling, and producing some foam by pouring it back and forth between two containers for proper serving. More foam, which is desirable is produced by cooler temperatures, but the tea itself is desirable to be hot, creating conflicting requirements.

The manual process of making this type of tea is cumbersome and has some specific drawbacks. For example, since a well-designed teapot for exactly this method of making green tea is not available and regular teapots are used, a makeshift spout plug, such as a cork or a piece of paper, has to be devised to plug the spout so the tea doesn't pour or spray out while it boils. Because of boiling temperatures, the teapot handle gets hotter than normal and an awkward insulated holder needs to be used to handle the teapot. Another common problem is that the manner of pouring the tea back and forth between different pots or cups to cool it and make foam is messy and causes tea to drip or spray around. The foaming process is also tedious. The whole process is also time consuming. Still another problem is that the serving of this tea is ceremonial and constitutes a social event. As such, the person making the tea ends up being detached from the rest of the group in order to tend to the process, and effectively cannot participate in the social gathering. The present disclosure resolves these and other problems and provides a more efficient and automated method of making this type of tea.

Illustrative Computing Device Configuration

FIG. 1 shows an illustrative computing device 100 that may represent any type of mobile, desktop, or server computer or embedded microcontroller. A computing device represented by computing device 100 may include less or more than all the components shown in FIG. 1 depending on the functionality needed. For example, a mobile computing device may include the transceiver 136 and antenna 138, while a server computing device may not include these components. Those skilled in the art will appreciate that the scope of integration of components of computing device 100 may be different from what is shown. As such, some of the components of computing device 100 shown in FIG. 1 may be integrated together as one unit. For example, NIC 130 and transceiver 136 may be implemented as an integrated unit. Additionally, different functions of a single component may be separated and implemented across several components instead. For example, different functions of I/O processor 120 may be separated into two or more processing units.

With continued reference to FIG. 1, computing device 100 includes mass storage 132, Central Processing Unit (CPU) 104, memory module 106, display interface 114, input devices 118, Input/Output (I/O) processor 120, bus 122, various other interfaces 126, Network Interface Card (NIC) 130, power supply 134, transceiver 136, and antenna 138, all interconnected for electronic communication via data and/or control and/or address bus 122. Memory module 106 may include software such as Operating System (OS) 108, and a variety of software application programs and/or software modules/components 110-112. Such software modules and components may be stand-alone application software or be components, such as DLL (Dynamic Link Library) of a bigger application software. Computing device 100 may also include other components not shown in FIG. 1. For example, computing device 100 may further include an illuminator (for example, a light), graphic interface, and portable storage media such as USB drives. Computing device 100 may also include other processing units, such as a math co-processor, graphics processor/accelerator, and a Digital Signal Processor (DSP).

Mass storage device 132 may include magnetic disks, magnetic tapes, optical drives for using optical media, such as CD (Compact Disc), DVD (Digital Video Disc), and the like. Mass storage devices 132 may provide large data and software storage as well inexpensive ways for storing information for archival and/or distribution purposes. In various embodiments, mass storage 132 may be a hard disk having a Ferro-magnetic stack of one or more disks forming a disk drive embedded in or coupled to computing device 100. A hard disk may be implemented as a solid-state device configured to behave as a disk drive, such as a flash-based hard drive. The mass storage device 132 may be a remote storage accessible over network interface 130 or another interface 126, but acting as a local hard drive. Those skilled in the art will appreciate that other technologies and configurations may be used to present a hard drive interface and functionality to computing device 100 without departing from the spirit of the present disclosure. In some embodiments, the mass storage devices may include USB (Universal Serial Bus) drives that may be implemented by PCM (Phase Change Memory) arrays, flash memory including NOR and NAND flash, pluggable hard drive, and the like.

Central Processing Unit (CPU) 104 may be the main processor for software program execution in computing device 100. CPU 104 may represent one or more processing units that obtain software instructions from memory module 106 and execute such instructions to carry out computations and/or transfer data between various sources and destinations of data, such as mass storage devices 132, I/O processor 120, display interface 114, input devices 118, and the like.

Memory module 106 may include RAM (Random Access Memory), ROM (Read Only Memory), and other storage means, mapped to one addressable memory space. Memory module 106 illustrates one of many types of computer storage media for storage of information such as computer readable instructions, data structures, program modules or other data. Memory module 206 may store a Basic Input/Output System (BIOS) for controlling low-level operation of computing device 100. Memory module 106 may also store OS 108 for controlling the general operation of computing device 100. The OS 108 may include a general-purpose operating system such as a version of UNIX, or LINUX™, or a specialized client-side and/or mobile communication operating system such as Windows Mobile™, Android®, or the Symbian® operating system.

Memory module 106 may further include one or more distinct areas (by address space and/or other means), which can be utilized by computing device 100 to store, among other things, applications and/or other data. For example, one area of memory module 106 may be set aside and employed to store information that describes various capabilities of computing device 100, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Display interface 114 may be coupled with a display unit (not shown), such as liquid crystal display (LCD), gas plasma, light emitting diode (LED), or any other type of display unit that may be used with computing device 100. Display units coupled with display interface 114 may also include a touch sensitive screen arranged to receive input from an object such as a stylus or a digit from a human hand. Display interface 114 may further include interface for other visual status indicators, such Light Emitting Diodes (LED), light arrays, and the like. Display interface 114 may include both hardware and software components. For example, display interface 114 may include a graphic accelerator for rendering graphic-intensive outputs on the display unit. In one embodiment, display interface 114 may include software and/or firmware components that work in conjunction with CPU 104 to render graphic output on the display unit.

Input devices 118 may include a variety of device types arranged to receive input from a user, such as a keyboard, a keypad, a mouse, a touchpad, a touch-screen (described with respect to display interface 114), a multi-touch screen, a microphone for spoken command input (for use with an audio interface), and the like.

I/O processor 120 is generally employed to handle transactions and communications with peripheral devices such as mass storage, network, input devices, display, and the like, which couple computing device 100 with the external world. In small, low power computing devices, such as some mobile devices, functions of the I/O processor 120 may be integrated with CPU 204 to reduce hardware cost and complexity. In one embodiment, I/O processor 120 may the primary software interface with all other device and/or hardware interfaces, such as mass storage 132, other interfaces 126, display interface 114, and input devices 118.

An electrical bus 122 internal to computing device 100 may be used to couple various other hardware components, such as CPU 104, memory module 106, I/O processor 120, and the like, to each other for internally specifying memory and register addresses for transferring data, instructions, status, and other similar information to the specified addresses.

Various other interfaces 126 may include other electrical and/or optical interfaces for connecting to various hardware peripheral devices and networks, such as speakers and microphones for audio interface, GPS (Global Positioning System), IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 130 may include circuitry for coupling computing device 100 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Power supply 134 provides power to computing device 100. A rechargeable or non-rechargeable battery may be used to provide power. The power may also be provided by an external power source, such as an AC adapter or a powered docking cradle that supplements and/or recharges a battery.

Transceiver 136 generally represents transmitter/receiver circuits for wired and/or wireless transmission and receipt of electronic data. Transceiver 136 may be a stand-alone module or be integrated with other modules, such as NIC 130, GPS hardware that may be part of the computing device. Transceiver 136 may be coupled with one or more antennas for wireless transmission of information.

Antenna 138 is generally used for wireless transmission of information, for example, in conjunction with transceiver 136, NIC 130, and a GPS unit of the computing device. Antenna 138 may represent one or more different antennas that may be coupled with different devices and tuned to different carrier frequencies configured to communicate using corresponding protocols and/or networks. Antenna 138 may be of various types, such as omni-directional, dipole, slot, helical, and the like.

Figure 2:
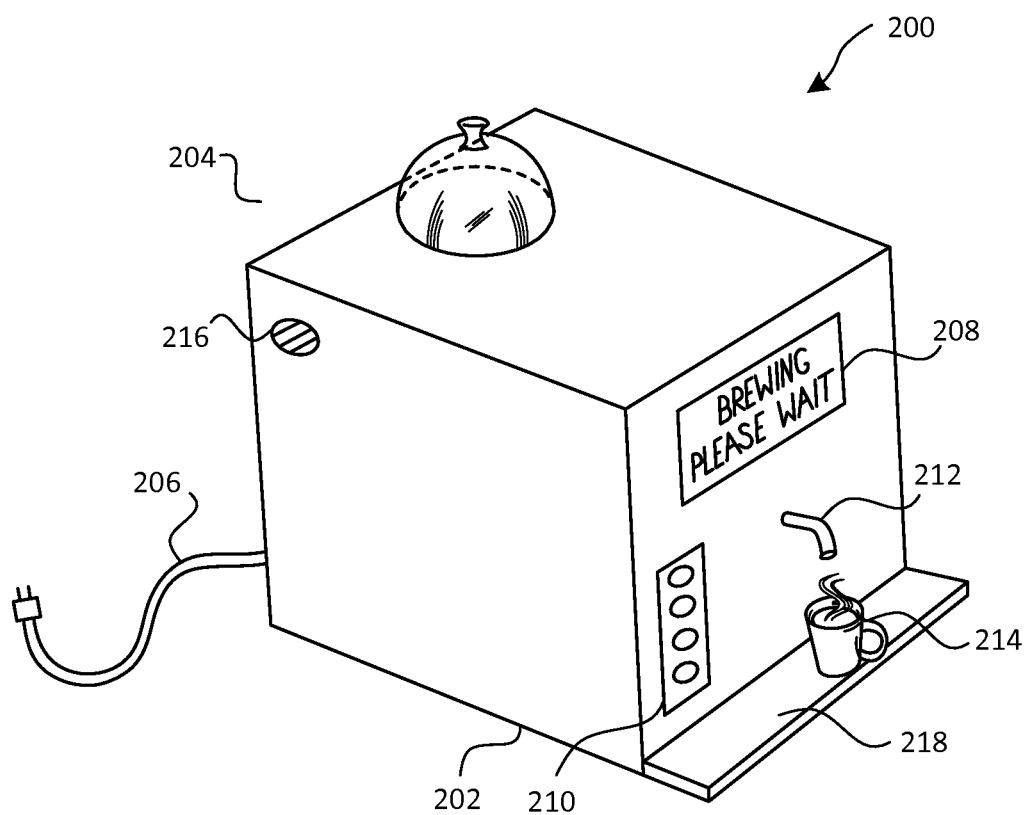
FIG. 2 shows an example automated tea maker.

FIG. 2 shows an example automated tea maker. In various embodiments, electronic teapot 200 includes housing or enclosure 202, container 204, electric cord 206, display panel 208, control panel 210, dispensing spout 212, buzzer 216, and support ledge 218 for resting teacup 214.

In various embodiments, housing 202 may include a standalone container with all the components embedded within. This countertop configuration makes the electronic tea maker more portable and self-contained, so that it can be moved from one location to another as needed. In other embodiments, the housing may be integrated with a cabinet, be deployed inside a vault in a wall, be integrated within a counter such as a kitchen counter, and the like. In these stationary configurations, the tea maker may be used for more heavy duty use, such as in commercial establishments like cafeterias. Because of the integrated nature of these configurations, various components and features may be added that are not needed or cost effective or feasible due to limited size and weight for the countertop models. For example, the electrical wiring may be hard-wired (without use of removable electrical plug), the plumbing for water may be integrated, so there is no need to add water to the pot; a filter may be used to filter the water used to make tea to make it more pure and taste better; internet connection may be provided to order various types of tea, accessories, spices and the like, while the user is consuming and experiencing the tea at the time, or to replenish supplies; options for selection of various types of teas and spices to brew, and other similar features that are more cost effective and useful for integrated configurations.

In various embodiments, indicators and user interfaces may be used to communicate with the user, such as lights, beepers and buzzers 216, and display panels 208. These indicators may be used to communicate the state or status of the tea or other beverage being brewed. For example, a display may be used to show what type of tea is being brewed, what spices are selected to be added, how long it takes to have the tea ready, in what stage of the brewing process it currently is, and the like. Similarly, different colored lights and buzzers can indicate when the tea is ready, whether the tea maker is on or off, and the like. For example, a red light can show the tea maker is on, while a green light can indicate when the machine is ready for a new selection or brewing cycle. A buzzer can similarly make different sounds or beeps to indicate various states like the aforementioned. For example, a long beep or buzz can indicate that the tea is ready, while a change of brewing state (such as starting to heat up or cool down) may be indicated by a short chirp.

In various embodiments, the control panel 210 may be used to select various functions such as starting a brew process, seeing the current status, stopping the brewing, or dispensing tea from spout 212. The control panel may include buttons, knobs, handles, and other similar inputs and actuators. In some embodiments, the control panel may be integrated with display 208, which may be a touch sensitive display to be used for showing data as well as inputting user commands and requests.

In various embodiments, container 204 may be for tea and spices while the water is supplied from an integrated water pipe. In other embodiments, the container may receive water as well from a top opening.

Figure 3:
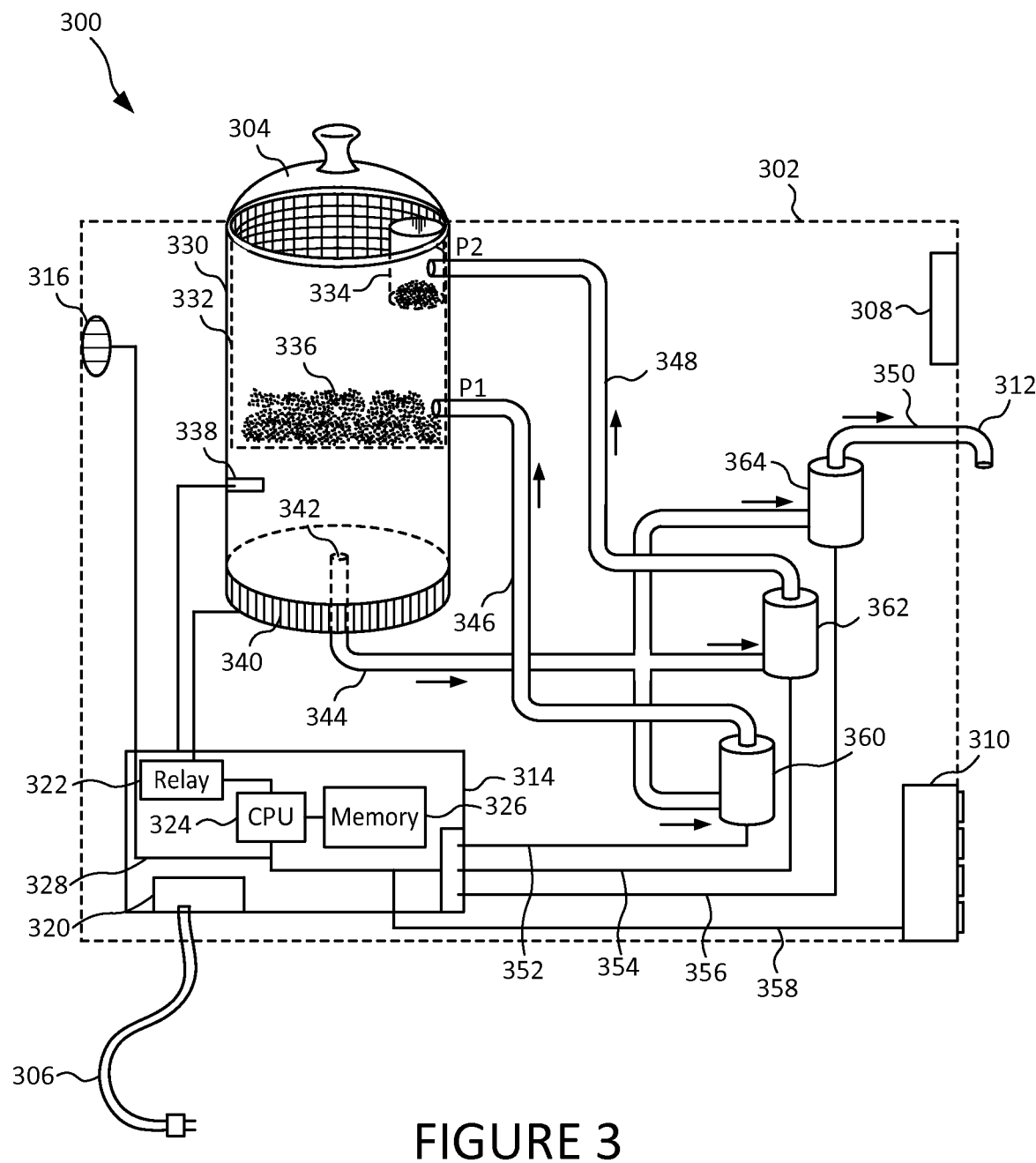
FIG. 3 shows detailed structure and components of the example automated tea maker of FIG. 2.

FIG. 3 shows detailed structure and components of the example automated tea maker of FIG. 2. In various embodiments, electronic tea maker 300 includes housing 302, container cap 304, electric power cord 306, display panel 308, control panel 310, dispensing spout 312, controller or control board 314, buzzer or beeper 316, power transformer or adapter 320, heater relay switch 322, CPU 324 similar in form and function to CPU 104 described above with respect to FIG. 1, memory 326 similar in form and function to memory 106 described above with respect to FIG. 1, electronic control/address/data/power multi-bit bus 328 to carry various electrical signals for addressing and data transfer and supplying power to various electronic components, beverage brewing container 330, internal mesh or perforated tea basket 332, small mesh or perforated spice basket/container 334, tea or other brewing plants and herbs 336, thermistor 338, heating element 340, outlet 342, pump input tube 344, brew return tube 346, spice tube 348, dispensing tube 350, brew pump control line 352, spice pump control line 354, dispensing pipe control line 356, control panel signal line 358, brew pump 360, spice pump 362, and dispensing pump 364.

In various embodiments, brewing container 330 is used to receive the ingredients for the tea (or other beverage), such as water, tea leaves, spices, sugar, milk, cream, and the like, and to mix and heat the beverage. This container may be made in any suitable shape such as cylindrical, cubic, irregular, and the like. It may also be made of any suitable hot food material such as stainless steel, aluminum, copper, heat resistant plastics and other synthetics, and the like. In some embodiments, water may be supplied via an additional water inlet pipe (not shown in FIG. 3) or be manually added through the container opening under cap 304. The stainless steel or food-safe plastic mesh basket 332, may have a handle that fits snugly inside the pot 330 and is about half the height of the pot. This screen may be used as a filter to hold the lose tea leaves and other herbs so they do not get into the plumbing and pumps. A smaller (in both diameter and height) stainless steel or food-safe plastic mesh basket may be hung from the rim of the pot 330 and sit high up inside the pot, a part of it touching the inside of the pot and tangent to it. This basket may be used as the condiment basket for the sugar, mint, and any other condiments, like vanilla flavored sugar that the user wishes to add. A hole on the side of the spice container may be used for coupling with the tube 348 from pump 362 for mixing of spices with the tea as further described below.

In various embodiments, display panel module 308 may be an LCD (Liquid Crystal Display) monitor, a touch-sensitive screen, a dot-matrix display, or other type of display capable of displaying simple messages and/or graphics or animation. For example, the display can animate the brewing of the tea or current brewing status, or it can display a message or icon conveying different messages such as "Tea is ready" or "Waiting for user selection," and the like. In various embodiments, controller 314 has various electronic modules for interacting with user through software and/or hardware, and for controlling various hardware elements such as the heater, the input (for example, control panel) and output (for example, display, buzzer, and lights) modules, and the pumps. In some embodiments, the controller includes CPU 324, which is programmed via software stored in memory 326 to control the operations of the electronic tea maker 300. In some embodiments, the controller 314 may be a PCB (Printed Circuit Board) with a microcontroller having embedded memory. In other embodiments, other off the shelf pre-fabricated control boards may be used such as Arduino Uno. In still other embodiments, a custom board with a common microcontroller, such as Atmel microcontroller, may be used with the same source code.

In some embodiments, various versions of an operating system or application software may be downloaded into the memory, which may be used for different types of brewing or to improve existing methods of brewing. Such software changes may alter the length of time of a step or stage, such as boiling or cooling, in the brewing process, the sequence of steps, the number and types of steps, the displayed information, the system behavior in response to user input, and the like.

In various embodiments, the pumps are used to circulate the beverage through various stages of brewing, as further described in detail below. Food-safe mini pumps may be rated for high temperatures, such as >212 degrees Fahrenheit, and turned ON or OFF by the microcontroller. The pumps may be constant or variable speed fluid pumps controlled by the controller board to start, stop, and adjust flow speed. In some embodiments the food-safe tube 344 may be coupled with the hole 342 at the bottom of the teapot 330 and split into three branches, each of which feeding into the input of one of the pumps. Tube 346 from the output of the brew pump 360 feeds back into a opening/hole on the side of the pot 330, just over half way up at P1. Another tube 348 from the output of spice pump 362 feeds back into another hole on the side of the pot and into the spice basket 334, at a point P2 on the pot that is higher up than the brew pump outlet hole at P1.

In various embodiments, heating element 340 may be a plate, a ring, or one or more of other types of heating elements that surround the container 330 to heat up the beverage inside for brewing. The thermistor 338 is used by the controller to detect and read the temperature inside the container to avoid overheating beyond what is necessary.

In various embodiments, control panel 310 may be an array of physical buttons and knobs, each sending a signal to the controller when pressed to perform a particular function, such as Turn-On the tea maker, Turn-Off, Start brewing, Stop Brewing, Add Sugar and Spices, and the like. In other embodiments, more detailed input may be provided by the user using the touch sensitive screen 308, or a small alpha-numeric keypad to enter various commands or pick menu items from a software-generated GUI (Graphical User Interface) to select and activate various functions of the tea maker.

In various embodiments, in typical operation, a user starts by placing some water and tea inside the container 330. He may also add some sugar and other spices, such as cinnamon and cardamom, into the spice container 334. The user may then proceed to turn on the tea maker using the control panel 310. Those skilled in the art will appreciate that the steps described herein may be performed in a different order than described here. For example, the user may first turn on the tea maker, and add water to boil before adding tea and spices. The user may start the brewing process using another command. In some embodiments, the commands may be combined. For example, turning on the tea maker and starting the brewing process may be done with a single command or button.

The tea maker enters the brewing mode upon user command and starts various brewing steps automatically under program control without further user input. The user may add a first number of parts (such as one) green tea and a second number parts (such as four) water. The proportion of water and tea depends on how strong a beverage is desired. The more tea compared with water, the stronger the resulting beverage. The user may further add some sugar and any other condiments into the separate spice compartment 334 inside the tea pot. The user may then press the Start or Brew button on the control panel 310 to start the automatic brewing process.

At a basic or high level, the tea maker goes through the steps of boiling, cooling, adding sugar and other spices and condiments, and cooling the tea again to a serving temperature. During these steps, the tea maker also moves the tea using the various pumps to cause foaming, which is desirable in some types of teas and other beverages. The overall process may take about 20-30 minutes, but it can also be programmed to take less or more time depending on the type of beverage and user preferences. When the tea maker indicates that the tea is ready for serving, for example, by sounding a buzzer or turning on a green light, the user may place the serving cup or glass under the spout and press the Serve button on the control panel to dispense the tea. The spout may have a tight outlet or aerating tip configuration to dispense the tea in a foaming jet, using the dispensing pump, which automatically creates more integral foam or froth as the glass fills up.

More specifically, in some embodiments, in operation, custom software code written in a suitable computer language, such as the Atmel processor language, may continuously poll all of the inputs such as the control panel 310 knobs and buttons and the temperature probe 338, and switch the pumps and heater on and off accordingly based on the button pressed and the point in the process at which it is operating. To automate the basic process described above, in some embodiments, the code may carry out the following sequence of actions automatically:

1. Sample or test the signal from the Start button on the control panel to be detected
2. Turn on an indicator, such as a red LED, to let the user know the machine is in operation, turn on the heater and monitor the temperature probe output until it reads about 205 degrees Fahrenheit, the target brew temperature or maximum temperature the brew should reach.
3. Start a heater timer for heater operation.
4. Turn off the heater after the heater timer expires.
5. Wait a few minutes.
6. Turn on pump 1 at about 75% speed for a few minutes. This causes tea from the pot to run back into the pot through the tubes, cooling the tea, unfurling the leaves in the tea basket, and creating the foam in the pot thereby aerating, infusing, and steeping the tea, all at the same time.
7. Stop brewing pump 360 and wait a few minutes.
8. Again turn on the heater and monitor the temperature probe output until it reads about 205 degrees Fahrenheit.
9. Turn on spice pump 362 at about 30% speed. This causes tea from the pot to run back into the pot over the sugar and condiments in the condiment basket 334. This technique overcomes the need for a mechanical method of pouring the sugar into the pot. By just running the hot tea through this mesh basket containing the sugar and other condiments, those ingredients are mixed in.
10. Wait a few minutes and turn off spice pump.
11. Turn off the heater.
12. Turn on brewing pump at about 75% speed for a few minutes to cool the tea.
13. Turn off brewing pump.

14. Read the temperature probe output. If tea is too hot to serve (hotter than serving temperature), then wait a few minutes. If too cool, turn on the heater briefly and repeat until tea is at optimum serving temperature.

15. Turn off the red LED, turn on the green LED to indicate machine's brewing cycle is complete, and sound the buzzer.

16. Continually test for the Serve button.

17. If the Serve button is pressed, turn on dispensing pump 364, and turn it off when Serve button is released.

Those skilled in the art will appreciate that all of the parameters mentioned above, including wait times, delays, timer settings, pump speeds, temperature thresholds and settings, and the like may be programmed into the machine and be adjusted as needed through a programming and/or user interface.

Other Operating Modes of the Tea Maker

In various embodiments, the machine may also have other modes of operation than just brewing tea, where different or additional code paths may be executed in each case. Some of these other operating modes are described below.

Cleaning Mode

In various embodiments, the user may remove the tea screen 332 and condiment basket 334 to wash separately, and pours clean water into the pot. The code runs through a similar set of operations described above but this time only heats the water and runs it through the two internal tubes. It then sounds the buzzer to indicate that the internal self-cleaning is done. The user may then presses the Serve button to empty out the water from the spout 312 which cleans the third outlet tube path 350. This mode is useful if the machine has not been used for a while, as a way to clean out all the internal plumbing with hot water.

Manual Override Mode

In this mode, the tea or other hot beverage is not made automatically. The software essentially turns the control panel 310 buttons (or other user interface such as the touch screen 308) into individual controllers of the components. For example, in this mode, the function of the Start button may changed to controlling the on/off state of the heater only, not the whole operation of the machine as in automatic mode. The functions of the other buttons and knobs may each control one of the pumps. In this mode, the user can make the tea himself using a different process than the programmed-in default. The time delays are implemented by the delay or timing in user's own actions. For example, he can wait a number of minutes he wants before starting the next step to cool or heat the tea more or less. This mode may be useful if someone desires to make the tea differently, or he is making another kind of tea altogether, like Indian chai spice tea. In some embodiments, manual override may be selectively chosen for one or more steps of the automatic brewing process. For example, while the tea maker is automatically brewing the tea, the user may manually intervene to eliminate a step, add a step, repeat a step, or make a step shorter or longer.

Other Functionality & Programmability

In various embodiments, the behavior of the tea making machine may be altered programmatically to make other types of tea, like the Indian chai spice tea mentioned earlier, by simply altering the software. In some embodiments, the machine may include several coexisting or built-in options and algorithms to brew different kinds of teas or beverages based on user selection. Additionally the machine can be adapted or programmed to make any kind of hot, pot beverage with light consistency that is made by heating or brewing the main ingredients in a liquid.

In other embodiments, the machine may be provided as an open hardware platform, so enthusiasts can download/upload their own programs or software applications to it, to either customize the default tea making process or implement a separate new one altogether. In such configurations, standard or industry-recognized executable file formats, such as ELF (Executable and Linkable Format) and CAB (CABinet file), may be generated by the user using existing third-party software development tools, such as Microsoft's Visual Studio® and Google's Android Studio or other processor-specific development tools, to develop the software brewing application in a computer language of their choice and download/upload it to the tea maker. In some embodiments, the user may select a particular type of hot beverage, such as different types of tea, from an existing menu on the tea maker. The tea maker may then automatically download an appropriate brewing software application from a server via the Internet, based on the user selection, to perform the type of brewing requested by the user. Third party services may be provided through which the machine may download, through the Internet, other software applications implementing different methods of brewing based on various other users' recipes.

Figure 4:
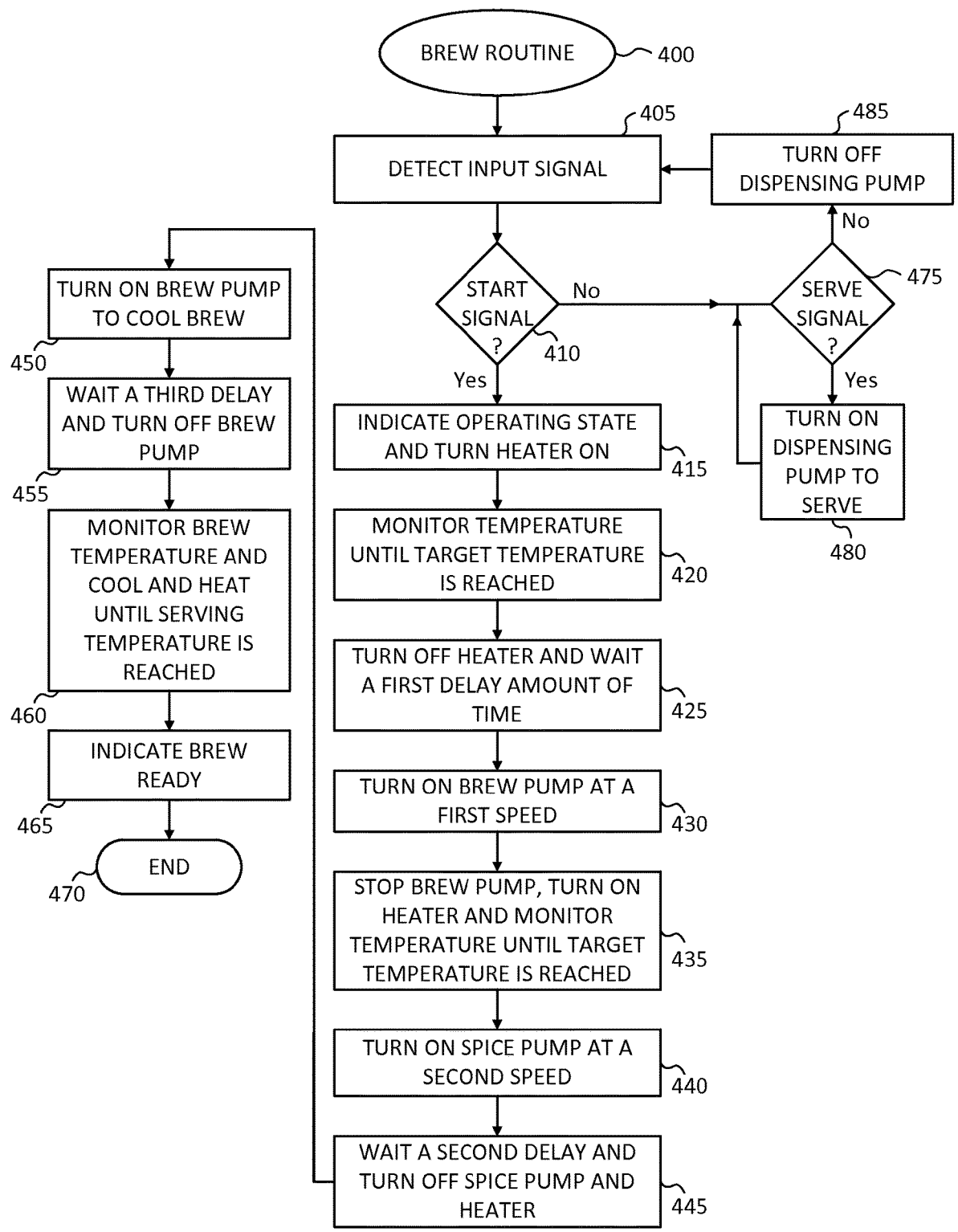
FIG. 4 shows a flow diagram for an example method of making tea carried out by the example automated tea maker of FIG. 2.

FIG. 4 shows a flow diagram for an example method of making tea carried out by the example automated tea maker of FIG. 2. In various embodiments, the brewing process 400 proceeds to block 405.

At block 405, the input signals from the user is detected. The routine proceeds to block 410.

At block 410, if the detected signal is Start to indicate the start of the automatic brewing, the routine proceeds to block 415, otherwise, it proceeds to decision block 475.

At decision block 475, if the Serve signal is detected from the control panel or other user interface, dispensing pump 364 is turned on at an appropriate speed to dispense the brew into a cup for the duration of the activation of the Serve signal. If the Serve signal is not detected, the routine proceeds to block 485.

At block 485, the dispensing pump is turned off (if it is ON), and the routine proceeds back to block 405.

At block 415, the machine provides an indication that it is entering the automatic brewing operating mode, for example, by turning on a red LED. The heater is turned on to start heating the beverage. The routine proceeds to block 420.

At block 420, the temperature is monitored via the thermistor 338 to detect when a target temperature, such as 205 degrees, Fahrenheit is reached. Those skilled in the art will appreciate that the target brew temperature any be set to any other value within the liquid thermal range of the brew, such as 185 degrees, or 210 degrees, and the like. The target brew temperature is the maximum temperature, which the brew should not exceed in the process. The routine proceeds to block 425.

At block 425, the heater is turned off and the machine waits a first delay amount of time. Such delay may be set by the user through the user interface or be build into the software. The routine proceeds to block 430.

At block 430, the brew pump 360 is turned on at a first speed, such as 75% of maximum speed, to circulate the tea through the brew pump for cooling and foaming from the teapot 330 back to the teapot. The routine proceeds to block 435.

At block 435, the brew pump is stopped, the heater is turned on, and the brew temperature is monitored until it reaches the target brew temperature again. Process steps 425-435 may be repeated a predetermined or set number of times to maximize foaming. The routine proceeds to block 440.

At block 440, the spice pump 362 is turned on at a second speed, such as 30% of maximum speed to drive the brewed beverage or tea through the spice basket 334. In this step, the brew is mixed in with additional spices and condiments such as sugar, cinnamon, and the like. The routine proceeds to block 445.

At block 445, the machine waits a second delay amount of time and turns off the spice pump. It also turns off the heater and proceeds to block 450.

At block 450, the brew pump is turned on again to cool the brew and increase the foam. The routine proceeds to block 455.

At block 455, the machine waits a third delay amount of time and turns off the brew pump. The routine proceeds to block 460.

At block 460, the brew temperature is monitored to see if the serving temperature is reached. If the tea temperature is higher than the serving temperature, the tea maker turns on the brew pump, turns off the heater, and monitors the brew/tea's temperature to cool the brew down to the serving temperature. If the tea temperature is lower than the serving temperature, the heater is turned and the brew temperature is monitored until it is heated up to the serving temperature. The routine proceeds to block 465.

At block 465, the tea maker indicates that the brew is ready for serving, for example, by turning on a green LED and sounding the buzzer 316. The routing proceeds to block 470.

At block 470, the routine terminates.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A hot beverage making apparatus comprising:
   a single water and tea housing including a single brewing container, and a single heater that heats the single brewing container;
   a controller board, including a microcontroller with a memory, wherein the microcontroller controls an automatic operation of the beverage making apparatus via a software stored in the memory, and wherein the controller board controls a length of time of a step or a stage, a sequence of steps, recirculation of water and tea, number and types of steps, displayed information, and system behavior in response to a user input, and wherein the controller controllably and separately pours hot water over tea leaves and over spices; and a plurality of pumps including a first, a second and a third pump coupled with the single brewing container via a common pipe that is connected and in fluid communication with the single brew container, and the plurality of pumps coupled with the controller board, wherein the plurality of pumps receive their fluid inputs in common from the common pipe of the single brewing container, and wherein a fluid output of the first pump of the plurality of pumps returns to the single brewing container and passes through a first mesh or perforated basket that houses the tea leaves, wherein the first mesh or perforated basket is located inside the single brewing container, and wherein a fluid output of the second pump of the plurality of pumps returns to the single brewing container and passes through a second mesh or perforated basket that houses the spices, wherein the second mesh or perforated basket is positioned within the second mesh or perforated basket, and a fluid output of the third pump is connected to a dispensing spout.

2. The apparatus of claim 1, further comprising a tea basket and a spice basket deployed within the brewing container.

3. The apparatus of claim 1, further comprising a plurality of user interfaces.

4. The apparatus of claim 1, wherein the brewing container has a plurality of openings coupled with tubes attached to the plurality of pumps.

5. The apparatus of claim 1, wherein the controller board is configured to cause the plurality of pumps to circulate a beverage in the brewing container through the plurality of pumps and back to the brewing container.

6. The apparatus of claim 1, wherein the plurality of pumps include a brew pump, a spice pump, and a dispensing pump.

7. The apparatus of claim 1, wherein the controller board further includes a heater relay unit.

8. The apparatus of claim 1, wherein the controller board is coupled to a thermistor deployed within the brewing container.

9. The apparatus of claim 1, wherein the controller board is coupled with and controls a plurality of user interfaces.

10. A hot beverage making apparatus comprising:
a single water and tea housing including a single brewing container, a single heater, a display, and a control panel, wherein the heater heats the single brewing container;

a controller board, including a microcontroller with a memory, wherein the microcontroller controls an automatic operation of the hot beverage making apparatus via a software stored in the memory, and wherein a software application stored on the controller board memory is changeable by a user of the beverage making hardware platform, wherein the controller controls a length of time of a step or a stage, a sequence of steps, recirculation of water and tea, number and types of steps, displayed information, and system behavior in response to a user input, and wherein the controller controllably and separately pours hot water over tea leaves and over spices; and a plurality of pumps coupled and in fluid communication with the single brewing container via a common pipe that is connected to the single brewing container, wherein the plurality of pumps coupled with the controller board to move a hot beverage in and out of the single brewing container via tubes, wherein the plurality of pumps receive their fluid inputs in common from the common pipe of the single brewing container, and wherein a fluid output of a first pump of the plurality of pumps returns to the single brewing container and goes through a first strainer containing the tea leaves, wherein the first strainer is located inside the single brewing container, and a fluid output of a second pump of the plurality of pumps returns to the single brewing container and passes through a second strainer containing the spices, wherein the second strainer is located within the first strainer, and wherein a fluid output of a third pump of the plurality of pumps is connected to a dispensing spout.

11. The apparatus of claim 10, further comprising a thermistor coupled with the controller board to monitor a temperature of the hot beverage.

12. The apparatus of claim 10, wherein the hot beverage is African green tea.

13. The apparatus of claim 10, wherein a new software application for brewing hot beverages is downloadable to the controller board by the user.

14. The apparatus of claim 10, wherein the plurality of pumps are used to cool the hot beverage, to mix sugar and spices with the hot beverage, and to create foam in the hot beverage.

15. The apparatus of claim 10, wherein an appropriate software application is downloaded automatically based on a user selection of a beverage.

* * * * *